United States Patent
MacDonald et al.

(10) Patent No.: US 11,187,148 B1
(45) Date of Patent: Nov. 30, 2021

(54) POWER AND COOLING UNIT (PCU)

(71) Applicant: Hamilton Sundstrand Corporation, Charlotte, NC (US)

(72) Inventors: Malcolm MacDonald, West Hartford, CT (US); Ram Ranjan, West Hartford, CT (US); Brian M. Holley, Eastford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/947,426

(22) Filed: Jul. 31, 2020

(51) Int. Cl.
| | |
|---|---|
| F02C 6/06 | (2006.01) |
| F02C 3/04 | (2006.01) |
| F02C 7/10 | (2006.01) |
| F02C 7/18 | (2006.01) |
| F02C 1/05 | (2006.01) |
| F02C 3/10 | (2006.01) |
| F01D 15/10 | (2006.01) |
| F01K 25/10 | (2006.01) |
| F01K 11/02 | (2006.01) |

(52) U.S. Cl.
CPC .......... F02C 6/06 (2013.01); F01D 15/10 (2013.01); F01K 11/02 (2013.01); F01K 25/103 (2013.01); F02C 1/05 (2013.01); F02C 3/04 (2013.01); F02C 3/10 (2013.01); F02C 7/10 (2013.01); F02C 7/185 (2013.01); F05D 2220/75 (2013.01); F05D 2220/76 (2013.01)

(58) Field of Classification Search
CPC .... F02C 6/06; F02C 3/10; F02C 7/185; F02C 1/05; F02C 3/04; F02C 7/10; F01K 11/02; F01K 25/103; F01D 15/10; F05D 2220/75; F05D 2220/76
USPC .................... 60/655, 650, 682–684
See application file for complete search history.

(56) References Cited

U.S. PATENT DOCUMENTS

| | | | |
|---|---|---|---|
| 5,086,622 A * | 2/1992 | Warner | B64D 13/06 62/88 |
| 9,885,283 B2 | 2/2018 | Vaisman et al. | |
| 10,344,626 B2 | 7/2019 | Cha et al. | |
| 10,605,124 B2 | 3/2020 | Cha | |
| 10,641,132 B2 | 5/2020 | Cha | |
| 2008/0022688 A1 * | 1/2008 | Decrisantis | F28F 9/0265 60/751 |
| 2013/0118191 A1 * | 5/2013 | Zywiak | B64D 13/06 62/87 |

(Continued)

Primary Examiner — Hoang M Nguyen
(74) Attorney, Agent, or Firm — Kinney & Lange, P.A.

(57) ABSTRACT

A system includes a power cycle and a cooling cycle. The power cycle includes a first compressor, a recuperative heat exchanger, a waste-heat heat exchanger, and a turbine. The turbine includes a drive shaft coupled to the first compressor. The working fluid from the waste-heat heat exchanger drives the turbine, the drive shaft, and the first compressor. The recuperative heat exchanger cools the working fluid from the turbine, and at least one ram-air heat exchanger further cools the working fluid from the recuperative heat exchanger. The first compressor is configured to pressurize the working fluid from the at least one ram-air heat exchanger. The cooling cycle includes a pump, an isenthalpic valve, an ambient air heat exchanger, and a second compressor. The cooling cycle cools the working fluid and ambient air and is connected to the power cycle in the at least one ram-air heat exchanger.

20 Claims, 5 Drawing Sheets

(56) References Cited

U.S. PATENT DOCUMENTS

| | | | |
|---|---|---|---|
| 2016/0010902 A1* | 1/2016 | Andres | F25B 6/04 |
| | | | 62/236 |
| 2018/0087408 A1 | 3/2018 | Cha | |
| 2018/0170554 A1* | 6/2018 | Elsherbini | F25B 1/06 |
| 2019/0359340 A1* | 11/2019 | Pachidis | B64D 13/08 |

* cited by examiner

POWER AND COOLING UNIT (PCU)

BACKGROUND

The present disclosure generally relates to a system for an engine, and more specifically, to a system for an engine with integrated power and cooling units.

Gas turbine engines are widely used for electrical power generation and industrial applications, such as pumping materials through pipelines, marine propulsion, locomotive propulsion, automotive propulsion, and the propulsion of aircraft. A gas turbine engine typically has a cold section and a hot section. The cold section includes an intake and a compressor. The hot section typically includes a combustion chamber, turbine, and exhaust. Air enters the gas turbine engine at the intake and is pressurized in the compressor. After being pressurized in the compressor, the air is mix with fuel in the combustion chamber and ignited. Combustion gases are expelled from the combustion chamber into the turbine and turn the turbine. The combustion gases then leave the gases turbine engine through the exhaust. Though gas turbine engines offer many benefits, there are still opportunities to improve their efficiencies in terms of power utilization and cooling systems.

SUMMARY

In one example, a system includes a power cycle and a cooling cycle. The power cycle includes a first compressor used to pressurize a working fluid within the power cycle and a recuperative heat exchanger configured to receive and heat the working fluid in a first pass. The power cycle further includes a waste-heat heat exchanger configured to receive and further heat the working fluid from the first pass of the recuperative heat exchanger and a turbine. The turbine includes a drive shaft coupled to the first compressor, wherein the turbine is configured to receive the working fluid from the waste-heat heat exchanger, and wherein the working fluid from the waste-heat heat exchanger drives the turbine, the drive shaft, and the first compressor. The recuperative heat exchanger is configured to receive the working fluid from the turbine in a second pass and cools the working fluid. A ram-air heat exchanger configured to receive the working fluid from the second pass of the recuperative heat exchanger and further cool the working. The first compressor is configured to receive and pressurize the working fluid from the ram-air heat exchanger. The cooling cycle includes a second ram-air heat exchanger configured to receive and cool a portion of the working fluid from the first compressor, a pump configured to receive and pressurize the portion of the working fluid from the second ram-air heat exchanger. A third ram-air heat exchanger is configured to receive and further cool the portion of the working fluid from the pump. The cooling cycle further includes an isenthalpic valve configured to receive and expand the portion of the working fluid from the third ram-air heat exchanger. An ambient-air heat exchanger is configured to receive the portion of the working fluid from the isenthalpic valve and cool the ambient air of an aircraft via the portion of the working fluid. A second compressor configured to receive and pressurize the portion of the working fluid from the ambient air heat exchanger. The ram-air heat exchanger is configured to receive the portion of the working fluid from the second compressor, and the portion of the working fluid from the second compressor is mixed with the working fluid in the power cycle.

In another example, a system includes a power cycle and a cooling cycle. The power cycle includes a first compressor used to pressurize a working fluid within the power cycle and a recuperative heat exchanger configured to receive the working fluid from the first compressor in a first pass and heats the first pass of the working fluid from the first compressor. The power cycle further includes a waste-heat heat exchanger configured to receive the working fluid from the first pass of the recuperative heat exchanger and further heat the working fluid from the first pass of the recuperative heat exchanger and a turbine. The turbine includes a drive shaft coupled to the first compressor, wherein the turbine is configured to receive the working fluid from the waste-heat heat exchanger. The working fluid from the waste-heat heat exchanger drives the turbine, the drive shaft, and the first compressor, wherein the recuperative heat exchanger is configured to receive the working fluid from the turbine in a second pass and cool the second pass of the working fluid from the turbine. A first pass through a ram-air heat exchanger configured to receive the second pass of the working fluid from the recuperative heat exchanger and further cools the second pass of the working fluid from the recuperative heat exchanger. The first compressor is configured to receive the working fluid from the ram-air heat exchanger and pressurize the working fluid from the ram-air heat exchanger. The cooling cycle includes a second pass through the ram-air heat exchanger configured to receive a portion of the working fluid from the first compressor and cool the portion of the working fluid from the first compressor. A pump is configured to receive the portion of the working fluid from the second ram-air heat exchanger and pressurize the portion of the working fluid from the second ram-air heat exchanger. The cooling cycle further includes a third pass through the ram-air heat exchanger configured to receive the portion of the working fluid from the pump and to further cool the portion of the working fluid from the pump. An isenthalpic valve is configured to receive the portion of the working fluid from the third ram-air heat exchanger and expand the portion of the working fluid from the third ram-air heat exchanger. An ambient air heat exchanger configured to receive the portion of the working fluid from the isenthalpic valve and cool an ambient air of an aircraft at altitude via the portion of the working fluid from the isenthalpic valve. A second compressor is configured to receive the portion of the working fluid from the ambient air heat exchanger pressurize the portion of the working fluid from the ambient air heat exchanger. The ram-air heat exchanger is configured to receive the portion of the working fluid from the ambient air heat exchanger and pressurize the portion of the working fluid from the second compressor, and the portion of the working fluid from the second compressor is mixed with the portion of the working fluid in the power cycle.

In another example, a method including pressurizing a working fluid within a power cycle via a first compressor, and heating the working fluid via a first pass of a recuperative heat exchanger, wherein the first pass of the recuperative heat exchanger receives the working fluid from the first compressor. The method further includes heating the working fluid via a waste-heat heat exchanger, wherein the waste-heat heat exchanger receives the working fluid from the first pass of the recuperative heat exchanger and driving a turbine, a drive shaft, and a first compressor. The turbine receives the working fluid from the waste-heat heat exchanger, and wherein the turbine is coupled to the drive shaft and the first compressor. Cooling the working fluid from the turbine via a second pass of the recuperative heat exchanger and cooling the working fluid from the second pass of the recuperative heat exchanger further via a ram-air heat exchanger. The first compressor pressurizes the working fluid from the ram-air heat exchanger, and a portion of the working fluid is captured from the first compressor to power the cooling cycle. The cooling cycle includes cooling the portion of the working fluid from the first compressor via a second ram-air heat exchanger and pressurizing the portion of the working fluid from the second ram-air heat exchanger via a pump. The cooling cycle further includes cooling the portion of the working fluid from the pump via a third ram-air heat exchanger, expanding the portion of the working fluid from the third ram-air heat exchanger via an isenthalpic valve, and cooling ambient air via an ambient air heat exchanger using the portion of the working fluid from the isenthalpic valve. A second compressor pressurizes the portion of the working fluid from the ambient air heat exchanger, and in the ram-air heat exchanger, the portion of the working fluid from the second compressor is mixed with the working fluid from the power cycle.

DETAILED DESCRIPTION

A system is described herein for converting the waste heat of an engine into power generation and cooling, thereby improving the engine efficiency and cooling capabilities. The system includes a power cycle with a working fluid (e.g., supercritical carbon dioxide, helium, and or steam) that is pressurized via a first compressor and then heated in a recuperative heat exchanger. The working fluid is then further heated in a waste-heat heat exchanger, which uses waste heat from the engine as the hot fluid to heat the working fluid. The working fluid is then directed to a turbine and turns the turbine. The turbine is connected to a generator via at least one shaft to generate electrical power for the aircraft. Then, the working fluid is directed to a recuperative heat exchanger that cools the working fluid. After cooling in the recuperative heat exchanger, the working fluid is directed to a first ram-air heat exchanger to further cool the working fluid. The power cycle is complete as the working fluid is directed from the first ram-air heat exchanger back into the first compressor. The system also includes a cooling cycle that uses a portion of the working fluid extracted from the first compressor. A ram-air heat exchanger (either the first ram-air heat exchanger or a second ram-air heat exchanger) cools the portion of the working fluid. The portion of the working fluid is pressurized via a pump and cooled further by a ram-air heat exchanger (either the first ram-air heat exchanger, the second ram-air heat exchanger, or a third ram-air heat exchanger). An isenthalpic valve then decreases the pressure of the portion of the working fluid and further decreases the temperature of the portion of the working fluid. Then the portion of the working fluid cools the ambient air via an ambient-air heat exchanger. The ambient air cooled by the ambient-air heat exchanger can be used to cool a passenger cabin of an aircraft, electronics onboard the aircraft, main gas turbine engine turbines, or for any other system that needs cooling. A second compressor pressurizes the portion of the working fluid, and the portion of the working fluid is mixed back into the working fluid of the power cycle, thereby completing the cooling cycle. The system that converts the waste heat of an engine into electrical power and cooling is discussed in detail with reference to FIGS. 1-5 below.

Figure 1:
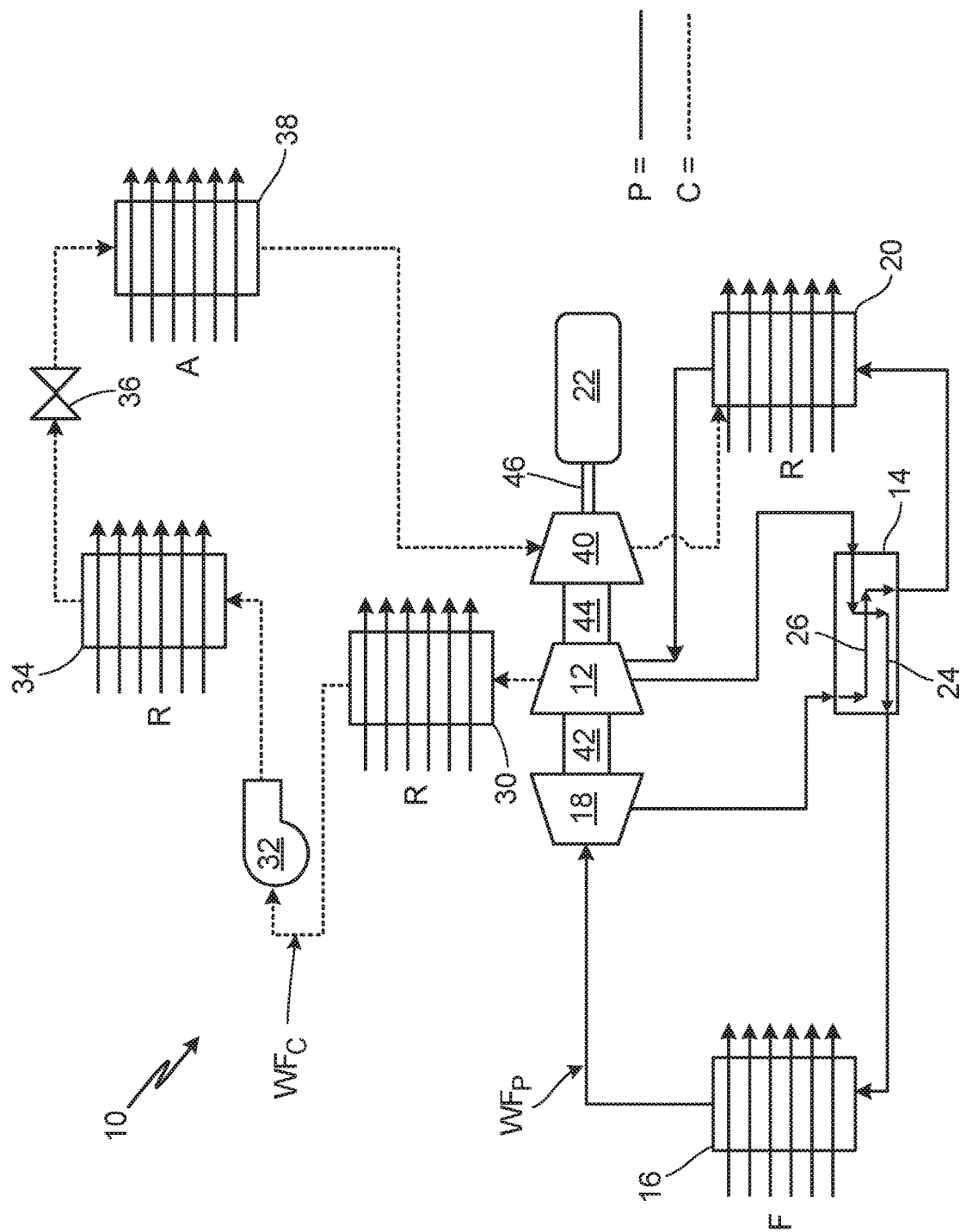
FIG. 1 is a schematic diagram of a system that converts waste heat into power and cooling for an engine.

FIG. 1 is a schematic diagram of system 10 that converts waste heat into power and cooling for an engine (not shown). The engine can be a gas turbine engine or an internal combustion engine. System 10 includes power cycle P (indicated by arrows with solid lines) and cooling cycle C (indicated by arrows with dashed lines). Power cycle P includes first compressor 12, recuperative heat exchanger 14, waste-heat heat exchanger 16, turbine 18, ram-air heat exchanger 20, generator 22, and working fluid $WF_P$. Recuperative heat exchanger 14 includes first pass 24 and second pass 26. Cooling cycle C includes second ram-air heat exchanger 30, pump 32, third ram-air heat exchanger 34, isenthalpic valve 36, ambient-air heat exchanger 38, second compressor 40, and working fluid $WF_C$. System 10 also includes first shaft 42, second shaft 44, and third shaft 46.

Working fluid ($WF_P$ and $WF_C$) flows through system 10 to operate power cycle P and cooling cycle C. Working fluid ($WF_P$ or $WF_C$) can be supercritical carbon dioxide, steam, helium, or any other noble gas. Throughout a cycle of system 10, the pressure and temperature of working fluid ($WF_P$ and $WF_C$) will change. Working fluid ($WF_P$ and $WF_C$) is configured to cycle through system 10 continually. Working fluid ($WF_P$ and $WF_C$) will be discussed in greater detail with reference to FIG. 5 below.

First compressor 12 pressurizes working fluid $WF_P$ and is fluidically connected to recuperative heat exchanger 14. First pass 24 of recuperative heat exchanger 14 is configured to receive working fluid $WF_P$ from first compressor 12 after first compressor 12 pressurizes working fluid $WF_P$. First pass 24 comprises the cool side passage(s) of recuperative heat exchanger 14. First pass 24 of recuperative heat exchanger 14 heats working fluid $WF_P$ and is fluidically connected to waste-heat heat exchanger 16. Waste-heat heat exchanger 16 is configured to receive working fluid $WF_P$ from first pass 24 of recuperative heat exchanger 14 and further heats working fluid $WF_P$ via waste heat F from the engine (not pictured). Waste heat F is made up of combustion products from the engine, such as exhaust gases from a gas turbine engine exhaust. Waste-heat heat exchanger 16 is fluidically connected to turbine 18. Turbine 18 is configured to receive working fluid $WF_P$ from waste-heat heat exchanger 16. Working fluid $WF_P$ drives, or rotates turbine 18 and first shaft 42. As working fluid $WF_P$ turns or rotates turbine 18 and first shaft 42, first shaft 42 provides power to first compressor 12, thereby powering power cycle P.

Turbine 18 is fluidically connected to second pass 26 of recuperative heat exchanger 14. Second pass 26 of recuperative heat exchanger 14 is configured to receive working fluid $WF_P$ from turbine 18. Second pass 26 comprises the hot side passage(s) of recuperative heat exchanger 14. Working fluid $WF_P$ in second pass 26 of recuperative heat exchanger 14 heats working fluid $WF_P$ in first pass 24 of recuperative heat exchanger 14. Furthermore, working fluid $WF_P$ of first pass 24 of recuperative heat exchanger 14 cools working fluid $WF_P$ in second pass 26 of recuperative heat exchanger 14. Second pass 26 of recuperative heat exchanger 14 is fluidically connected to first ram-air heat exchanger 20. First ram-air heat exchanger 20 is configured to receive working fluid $WF_P$ from second pass 26 of recuperative heat exchanger 14 and further cool working fluid $WF_P$. Ram air R of the aircraft is used as the cooling agent that cools working fluid $WF_P$ in second ram-air heat exchanger 30. Ram air R can be from an airstream surrounding the aircraft or can be from a bypass duct of the gas turbine engine. To complete power cycle P, first ram-air heat exchanger 20 is fluidically connected to first compressor 12, and first compressor 12 is configured to receive working fluid $WF_P$ from first ram-air heat exchanger 20.

Cooling cycle C starts by extracting a portion of working fluid $WF_P$ from first compressor 12 to get working fluid $WF_C$ for cooling cycle C. In one example, the volume of Working fluid $WF_C$ can range from 5% to 50% the volume of working fluid $WF_P$ based on the required aircraft heat load. In another example, the portion of working fluid $WF_P$ that is used to make up working fluid $WF_C$ can be regulated by a valve and can vary based on cooling capacity needs of the aircraft. Second ram-air heat exchanger 30 is configured to receive working fluid $WF_C$ from first compressor 12 and cools working fluid $WF_C$. Ram air R of the aircraft is used as the cooling agent that cools working fluid $WF_C$ in second ram-air heat exchanger 30. Ram air R can be from an airstream surrounding the aircraft or can be from a bypass duct of the gas turbine engine. Second ram-air heat exchanger 30 is fluidically connected to pump 32, and pump 32 is configured to receive working fluid $WF_C$ from second ram-air heat exchanger 30. Pump 32 pressurizes working fluid $WF_C$ and is fluidically connected to third ram-air heat exchanger 34. Third ram-air heat exchanger 34 is configured to receive working fluid $WF_C$ from pump 32 and further cools working fluid $WF_C$. Ram air R of the aircraft is used as the cooling agent that cools working fluid $WF_C$ in third ram-air heat exchanger 34. Ram air R can be from an airstream surrounding the aircraft or can be from a bypass duct of the gas turbine engine. Third ram-air heat exchanger 34 is fluidically connected to isenthalpic valve 36, and isenthalpic valve 36 is configured to receive working fluid $WF_C$ from third ram-air heat exchanger 34. Isenthalpic valve 36 decreases the pressure of working fluid $WF_C$ and thereby further decreases the temperature of working fluid $WF_C$. Isenthalpic valve 36 is fluidically connected to ambient-air heat exchanger 38. Ambient-air heat exchanger 38 is configured to receive working fluid $WF_C$ from isenthalpic valve 36 and uses working fluid $WF_C$ as the cooling agent to cool ambient air A.

Ambient air A can be collected while the aircraft is on the ground and stored onboard the aircraft or can be pumped from the air at altitude. After ambient air A is cooled in ambient-air heat exchanger 38, ambient air A can be used to reject a variety of heat loads from the aircraft such as cabin conditioning heat load, avionics, power electronics, directed energy weapons, and/or any other heat load on an aircraft.

Ambient-air heat exchanger 38 is fluidically connected to second compressor 40. Second compressor 40 is configured to receive working fluid $WF_C$ from ambient-air heat exchanger 38 and pressurizes working fluid $WF_C$. Second compressor 40 is fluidically connected to first ram-air heat exchanger 20, and first ram-air heat exchanger 20 is configured to receive working fluid $WF_C$ from second compressor 40. Within first ram-air heat exchanger 20, working fluid $WF_C$ is remixed with working fluid $WF_P$, and one cycle of cooling cycle C is complete. As shown in FIG. 1, power cycle P and cooling cycle C occur simultaneously and continuously as needed. In another example, power cycle P can be continuous, and cooling cycle C can operate intermittently to satisfy the cooling capacity requirements of the aircraft.

As shown in the example of FIG. 1, second shaft 44 mechanically couples second compressor 40 to turbine 18 such that turbine 18 powers both first compressor 12 and second compressor 40 as working fluid $WF_P$ turns turbine 18. Third shaft 46 mechanically couples generator 22 to turbine 18 such that turbine 18 provides rotational power to generator 22 as working fluid $WF_P$ turns turbine 18. Generator 22 turns the rotational power from turbine 18 into electrical energy that can be used throughout the aircraft. In some embodiments, a single shaft can be used to mechanically connect first compressor 12, second compressor 40, and/or generator 22 to turbine 18. In some embodiments, gearboxes and/or clutches can be used between turbine 18 and first shaft 42, second shaft 44, and third shaft 46 to allow each shaft to rotate at a different speed from the other shafts.

Figure 2:
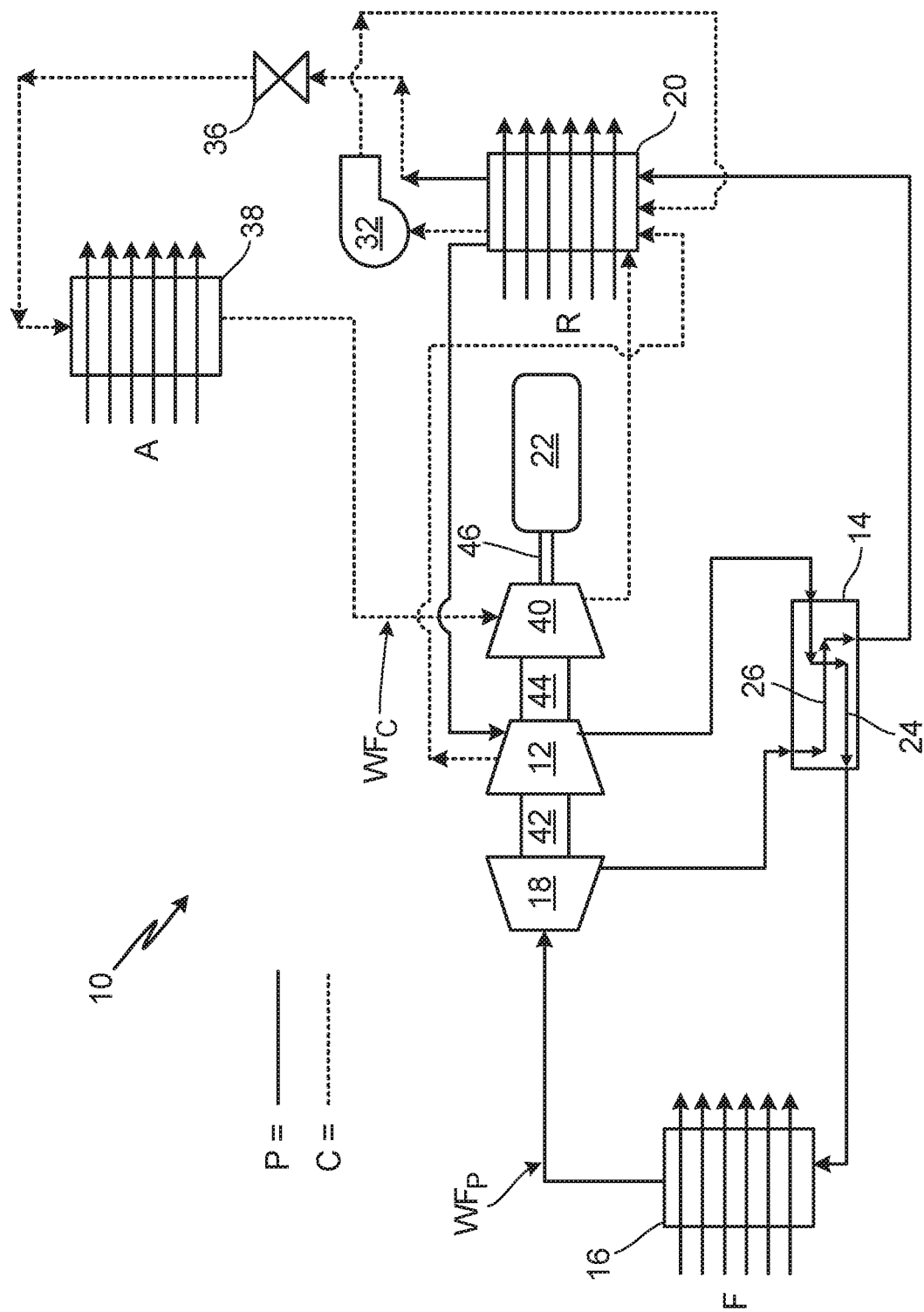
FIG. 2 is a schematic diagram of another embodiment of a system that converts waste heat into power and cooling for an engine.

FIG. 2 is a schematic of an alternative example of system 10 with a modified cooling cycle C. Power cycle C in the example of FIG. 2 is similarly configured to power cycle C of the example of FIG. 1 and operates in a similar manner. Cooling cycle C of the example in FIG. 2 has fewer ram-air heat exchangers than the example of FIG. 1.

Cooling cycle C in FIG. 2 starts by extracting a portion of working fluid $WF_P$ from first compressor 12 to get working fluid $WF_C$ for cooling cycle C. In one example, the volume of Working fluid $WF_C$ can range from 5% to 50% the volume of working fluid $WF_P$ based on the required aircraft heat load. In another example, the portion of working fluid $WF_P$ that is used to make up working fluid $WF_C$ can be regulated by a valve and can vary based on cooling capacity needs of the aircraft. First ram-air heat exchanger 20 is configured to receive working fluid $WF_C$ from first compressor 12 and cools working fluid $WF_C$. Ram air R of the aircraft cools working fluid $WF_C$ in first ram-air heat exchanger 20. Ram air R can be from an airstream surrounding the aircraft or can be from a bypass duct of the gas turbine engine. First ram-air heat exchanger 20 is fluidically connected to pump 32, and pump 32 is configured to receive working fluid $WF_C$ from first ram-air heat exchanger 20. Pump 32 pressurizes working fluid $WF_C$ and is fluidically connected to first ram-air heat exchanger 20. First ram-air heat exchanger 20 is configured to receive working fluid $WF_C$ from pump 32 and further cools working fluid $WF_C$. First ram-air heat exchanger 20 is fluidically connected to isenthalpic valve 36, and isenthalpic valve 36 is configured to receive working fluid $WF_C$ from first ram-air heat exchanger 20. Isenthalpic valve 36 decreases the pressure of working fluid $WF_C$ and thereby further decreases the temperature of working fluid $WF_C$. Isenthalpic valve 36 is fluidically connected to ambient air heat exchanger 38. Ambient-air heat exchanger 38 is configured to receive working fluid $WF_C$ from isenthalpic valve 36 and uses working fluid $WF_C$ as the cooling agent to cool ambient air A.

Ambient air A can be collected while the aircraft is on the ground and stored onboard the aircraft or can be pumped from the air at altitude. After ambient air A is cooled in ambient-air heat exchanger 38, ambient air A can be used to cool an electronic bay on the aircraft, a cabin or a passenger cabin, and/or any other area of an aircraft that requires cooling.

Ambient air heat exchanger 38 is fluidically connected to second compressor 40. Second compressor 40 is configured to receive working fluid $WF_C$ from ambient-air heat exchanger 38 and pressurizes working fluid $WF_C$. Second compressor 40 is fluidically connected to first ram-air heat exchanger 20, and first ram-air heat exchanger 20 is configured to receive working fluid $WF_C$ from second compressor 40. Within first ram-air heat exchanger 20 working fluid $WF_C$ from second compressor 40 is remixed with working fluid $WF_P$ and one cycle of cooling cycle C is complete. As shown in FIG. 1, power cycle P and cooling cycle C occur simultaneously and continuously as needed. In another example, power cycle P can be continuous, and cooling cycle C can operate intermittently to satisfy the cooling capacity requirements of the aircraft.

Figure 3:
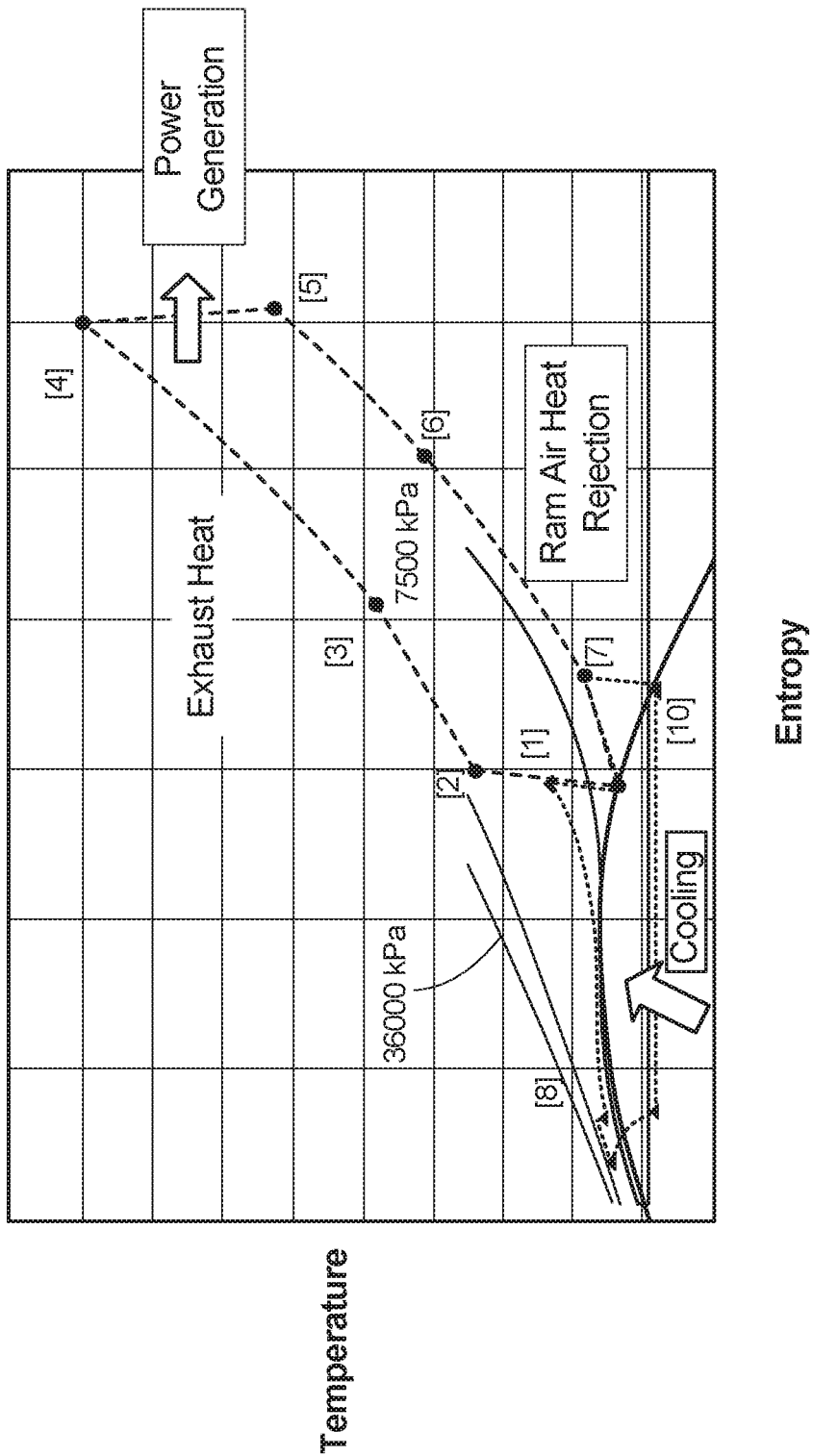
FIG. 3 is an example of a temperature vs. entropy graph for a power cycle and a cooling cycle of the systems described in FIGS. 1 and 2.

FIG. 3 is an example of a temperature vs. entropy graph for power cycle P and cooling cycle C of system 10 as described in FIGS. 1 and 2. Power cycle P starts at point 1 where first compressor 12 increases the pressure, thereby increasing the temperature and entropy of working fluid $WF_P$ until power cycle P reaches point 2. From point 2, first pass 24 of recuperative heat exchanger 14 further heats the working fluid $WF_P$, and as a result of heating, increases the entropy of working fluid $WF_P$ until point 3. From point 3, waste-heat heat exchanger 16 further heats and thereby increases the entropy of working fluid $WF_P$ until point 4. From point 4, working fluid $WF_P$ turns turbine 18, thereby generating power via shafts (42, 44, and/or 46). The power generated by working fluid $WF_P$ turning turbine 18 powers first compressor 12, second compressor 40, and generates electrical electricity via generator 22. As power is generated heat is released from working fluid $WF_P$ until point 5. From point 5, working fluid $WF_P$ goes through second pass 24 of recuperative heat exchanger 14, which decreases the temperature of working fluid $WF_P$ and, because of the decreased temperature, reduces the entropy of working fluid $WF_P$ until point 6. From point 6, working fluid $WF_P$ goes through first ram-air heat exchanger 20 to further cool working fluid $WF_P$ and thereby further decrease the entropy of working fluid $WF_P$ until point 7. From point 7, working fluid $WF_P$ is mixed back in with working fluid $WF_C$ and a portion of working fluid $WF_P$ is extracted and used as working fluid $WF_C$.

In the example of FIGS. 2 and 3, cooling cycle C operates directly above the vapor-liquid dome in a trans-critical state. From point 7, working fluid $WF_C$ is compressed to a supercritical state at point 1. From point 1, working fluid $WF_C$ is cooled below its critical temperature by either first ram-air heat exchanger 20 or second ram-air heat exchanger 30. Next, working fluid $WF_C$ is pressurized in pump 32, and further cooled in either first ram-air heat exchanger 20, second ram-air heat exchanger 30, or third ram-air heat exchanger 34. Then working fluid $WF_C$ is sent through isenthalpic valve 36, which drops the temperature and pressure, and working fluid $WF_C$ becomes a two-phase mixture of vapor and liquid. After leaving isenthalpic valve 36, working fluid $WF_C$ cools ambient air in ambient-air heat exchanger 38. After ambient-air heat exchanger 38, working fluid $WF_C$ goes into second compressor 40, which increases the pressure and temperature of working fluid $WF_C$ before mixing working fluid $WF_C$ back with working fluid $WF_P$.

Figure 4:
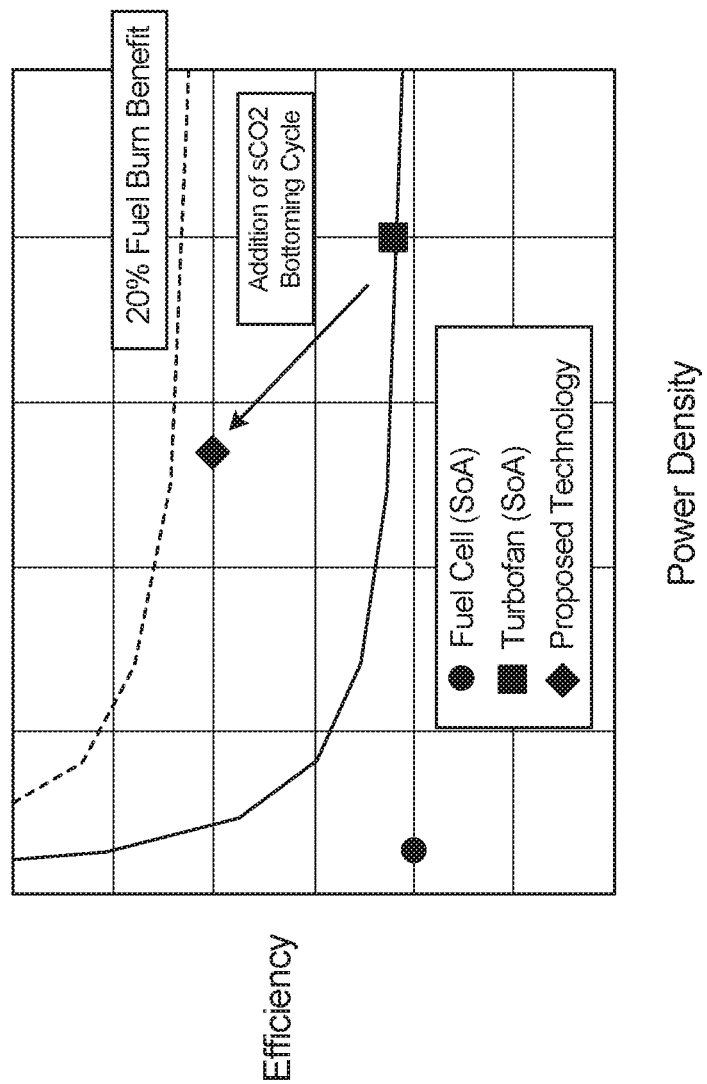
FIG. 4 is an efficiency vs. power density graph for the systems described in FIGS. 1 and 2 vs. current fuel cell and turbofan technologies.

FIG. 4 is an efficiency % vs. Power density graph for system 10 as described in FIGS. 1 and 2 vs. current fuel cell and turbofan technologies. As shown in the graph, system 10 increases the efficiency of a turbofan while maintaining power density of the turbofan. Furthermore, system 10 makes the turbofan significantly more efficient than a fuel cell. Overall, the benefit of system 10 is increasing the efficiency of an engine while maintaining the power density.

Figure 5:
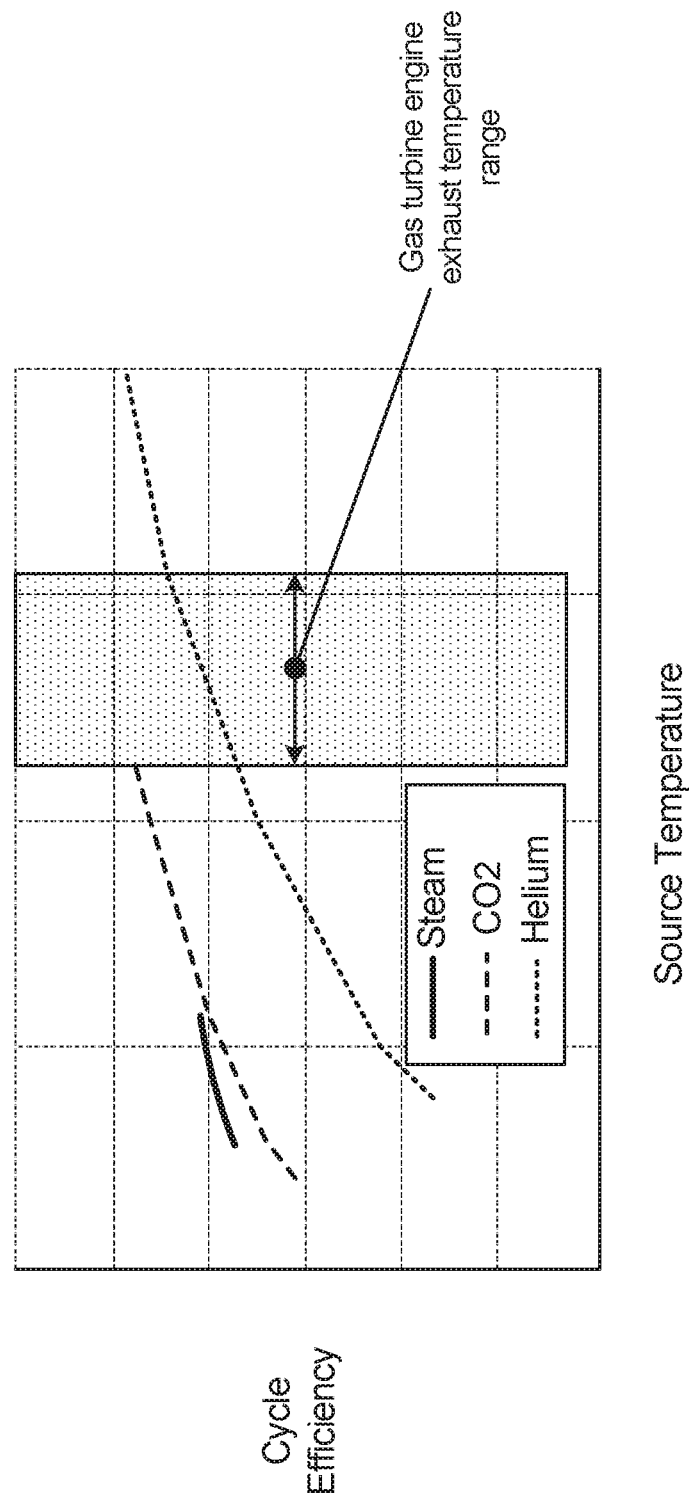
FIG. 5 is a cycle efficiency vs. source temperature graph for steam, carbon dioxide, and helium.

FIG. 5 is a cycle efficiency % vs. source temperature graph for steam, carbon dioxide, and helium. In the example of FIGS. 1 and 2, working fluid ($WF_P$ and $WF_C$) can be steam, supercritical carbon dioxide, helium, or any other noble gas. FIG. 5 shows the benefit of having helium or supercritical carbon dioxide as working fluid ($WF_P$ and $WF_C$). As shown in the graph of FIG. 5, carbon dioxide has the highest cycle efficiency for a fixed source temperature (i.e., a temperature of an engine exhaust of a gas turbine engine). Because carbon dioxide has the highest cycle efficiency for the source temperature range of a gas turbine engine's exhaust, carbon dioxide is an ideal working fluid ($WF_P$ and $WF_C$).

As described above in reference to FIGS. 1-5, system 10 integrates a power cycle and a cooling cycle to increase the efficiency of a jet turbine engine, while improving the cooling capacity of the jet turbine engine. With the increased efficiency, system 10 enables the jet turbine engine to use less gas, resulting in less weight and better fuel economy. With the increased cooling capacity, system 10 enables the consolidation of systems on the aircraft, decreasing the complexity, and saving weight on the aircraft.

Discussion of Possible Embodiments

The following are non-exclusive descriptions of possible embodiments of the present invention.

In one example, a system includes a power cycle and a cooling cycle. The power cycle includes a first compressor used to pressurize a working fluid within the power cycle and a recuperative heat exchanger configured to receive and heat the working fluid in a first pass. The power cycle further includes a waste-heat heat exchanger configured to receive and further heat the working fluid from the first pass of the recuperative heat exchanger and a turbine. The turbine includes a drive shaft coupled to the first compressor, wherein the turbine is configured to receive the working fluid from the waste-heat heat exchanger, and wherein the working fluid from the waste-heat heat exchanger drives the turbine, the drive shaft, and the first compressor. The recuperative heat exchanger is configured to receive the working fluid from the turbine in a second pass and cools the working fluid. A ram-air heat exchanger configured to receive the working fluid from the second pass of the recuperative heat exchanger and further cool the working. The first compressor is configured to receive and pressurize the working fluid from the ram-air heat exchanger. The cooling cycle includes a second ram-air heat exchanger configured to receive and cool a portion of the working fluid from the first compressor, a pump configured to receive and pressurize the portion of the working fluid from the second ram-air heat exchanger. A third ram-air heat exchanger is configured to receive and further cool the portion of the working fluid from the pump. The cooling cycle further includes an isenthalpic valve configured to receive and expand the portion of the working fluid from the third ram-air heat exchanger. An ambient-air heat exchanger is configured to receive the portion of the working fluid from the isenthalpic valve and cool the ambient air of an aircraft via the portion of the working fluid. A second compressor configured to receive and pressurize the portion of the working fluid from the ambient air heat exchanger. The ram-air heat exchanger is configured to receive the portion of the working fluid from the second compressor, and the portion of the working fluid from the second compressor is mixed with the working fluid in the power cycle.

The system of the preceding paragraph can optionally include, additionally and/or alternatively, any one or more of the following features, configurations and/or additional components:
wherein the working fluid is supercritical carbon dioxide;
wherein the working fluid is a noble gas;
a generator coupled to the drive shaft via a second shaft, wherein the drive shaft and the second shaft drive the generator to produce electrical power; and/or
a generator coupled to the turbine via the drive shaft, wherein the turbine and the drive shaft drive the generator to produce electrical power.

In another example, a system includes a power cycle and a cooling cycle. The power cycle includes a first compressor used to pressurize a working fluid within the power cycle and a recuperative heat exchanger configured to receive the working fluid from the first compressor in a first pass and heats the first pass of the working fluid from the first compressor. The power cycle further includes a waste-heat heat exchanger configured to receive the working fluid from the first pass of the recuperative heat exchanger and further heat the working fluid from the first pass of the recuperative heat exchanger and a turbine. The turbine includes a drive shaft coupled to the first compressor, wherein the turbine is configured to receive the working fluid from the waste-heat heat exchanger. The working fluid from the waste-heat heat exchanger drives the turbine, the drive shaft, and the first compressor, wherein the recuperative heat exchanger is configured to receive the working fluid from the turbine in a second pass and cool the second pass of the working fluid from the turbine. A first pass through at least one ram-air heat exchanger configured to receive the second pass of the working fluid from the recuperative heat exchanger and further cools the second pass of the working fluid from the recuperative heat exchanger. The first compressor is configured to receive the working fluid from the at least one ram-air heat exchanger and pressurize the working fluid from the at least one ram-air heat exchanger. The cooling cycle includes a second pass through the at least one ram-air heat exchanger configured to receive a portion of the working fluid from the first compressor and cool the portion of the working fluid from the first compressor. A pump is configured to receive the portion of the working fluid from the second pass through the at least one ram-air heat exchanger and pressurize the portion of the working fluid from the second pass through the at least one ram-air heat exchanger. The cooling cycle further includes a third pass through the at least one ram-air heat exchanger configured to receive the portion of the working fluid from the pump and to further cool the portion of the working fluid from the pump. An isenthalpic valve is configured to receive the portion of the working fluid from the third pass through the at least one ram-air heat exchanger and expand the portion of the working fluid from the third ram-air heat exchanger. An ambient air heat exchanger configured to receive the portion of the working fluid from the isenthalpic valve and cool an ambient air of an aircraft at altitude via the portion of the working fluid from the isenthalpic valve. A second compressor is configured to receive the portion of the working fluid from the ambient air heat exchanger pressurize the portion of the working fluid from the ambient air heat exchanger. The at least one ram-air heat exchanger is configured to receive the portion of the working fluid from the ambient air heat exchanger and pressurize the portion of the working fluid from the second compressor, and the portion of the working fluid from the second compressor is mixed with the working fluid in the power cycle.

The system of the preceding paragraph can optionally include, additionally and/or alternatively, any one or more of the following features, configurations and/or additional components:
wherein the working fluid is supercritical carbon dioxide;
wherein the working fluid is a noble gas;
a generator coupled to the drive shaft via a second shaft, wherein the drive shaft and the second shaft drive the generator to produce electrical power;
a generator coupled to the turbine via the drive shaft, wherein the turbine and the drive shaft drive the generator to produce electrical power;
the at least one ram-air heat exchanger further comprises a first ram-air heat exchanger, wherein the first ram-air heat exchanger comprises the first pass of the heat exchanger and the second pass of the heat exchanger; and a second ram-air heat exchanger, wherein the second ram-air heat exchanger comprises the third pass of the heat exchanger;
the at least one ram-air heat exchanger further comprises a first ram-air heat exchanger, wherein the first ram-air heat exchanger comprises the first pass of the heat exchanger;
and a second ram-air heat exchanger, wherein the second ram-air heat exchanger comprises the second pass of the heat exchanger and the third pass of the heat exchanger; and/or
the at least one ram-air heat exchanger further comprises a first ram-air heat exchanger, wherein the first ram-air heat exchanger comprises the first pass of the heat exchanger;
a second ram-air heat exchanger, wherein the second ram-air heat exchanger comprises the second pass of the heat exchanger; and a third ram-air heat exchanger, wherein the third ram-air heat exchanger comprises the third pass of the heat exchanger.

In another example, a method including pressurizing a working fluid within a power cycle via a first compressor, and heating the working fluid via a first pass of a recuperative heat exchanger, wherein the first pass of the recuperative heat exchanger receives the working fluid from the first compressor. The method further includes heating the working fluid via a waste-heat heat exchanger, wherein the waste-heat heat exchanger receives the working fluid from the first pass of the recuperative heat exchanger and driving a turbine, a drive shaft, and a first compressor. The turbine receives the working fluid from the waste-heat heat exchanger, and wherein the turbine is coupled to the drive shaft and the first compressor. Cooling the working fluid from the turbine via a second pass of the recuperative heat exchanger and cooling the working fluid from the second pass of the recuperative heat exchanger further via a ram-air heat exchanger. The first compressor pressurizes the working fluid from the ram-air heat exchanger, and a portion of the working fluid is captured from the first compressor to power the cooling cycle. The cooling cycle includes cooling the portion of the working fluid from the first compressor via a second ram-air heat exchanger and pressurizing the portion of the working fluid from the second ram-air heat exchanger via a pump. The cooling cycle further includes cooling the portion of the working fluid from the pump via a third ram-air heat exchanger, expanding the portion of the working fluid from the third ram-air heat exchanger via an isenthalpic valve, and cooling ambient air via an ambient air heat exchanger using the portion of the working fluid from the isenthalpic valve. A second compressor pressurizes the portion of the working fluid from the ambient air heat exchanger, and in the ram-air heat exchanger, the portion of the working fluid from the second compressor is mixed with the working fluid from the power cycle.

The method of the preceding paragraph can optionally include, additionally and/or alternatively, any one or more of the following features, configurations and/or additional components:

generating electrical energy via a generator coupled to the drive shaft via a second shaft;

generating electrical energy via a generator coupled to the turbine via the drive shaft;

cooling a cabin of an aircraft via the cooled ambient air;

cooling an electrical panel of an aircraft via the cooled ambient air;

wherein the working fluid is a supercritical carbon dioxide; and/or wherein the working fluid is a noble gas.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, as discussed in FIGS. 1-5, system 10 is added to a jet turbine engine of an aircraft. In another example, system 10 can be added to an internal combustion engine, a power generator, and/or any other system that would benefit from an integrated power and cooling cycle. Therefore, it is intended that the invention not be limited to the particular embodiment(s) disclosed, but that the invention will include all embodiments falling within the scope of the appended claims.

The invention claimed is:

1. A system comprising:
a power cycle comprising:
a first compressor used to pressurize a working fluid within the power cycle;
a recuperative heat exchanger configured to receive the working fluid in a first pass from the first compressor and heat the working fluid;
a waste-heat heat exchanger configured to receive the working fluid from the first pass of the recuperative heat exchanger and further heats the working fluid;
a turbine comprising a drive shaft coupled to the first compressor, wherein the turbine is configured to receive the working fluid from the waste-heat heat exchanger, and wherein the working fluid from the waste-heat heat exchanger drives the turbine, the drive shaft, and the first compressor,
wherein the recuperative heat exchanger is configured to receive the working fluid from the turbine in a second pass and cools the working fluid; and
a ram-air heat exchanger configured to receive the working fluid from the second pass of the recuperative heat exchanger and further cool the working fluid,
wherein the first compressor is configured to receive and pressurize the working fluid from the ram-air heat; and
a cooling cycle comprising:
a second ram-air heat exchanger configured to receive and cool a portion of the working fluid from the first compressor;
a pump configured to receive and pressurize the portion of the working fluid from the second ram-air heat exchanger;
a third ram-air heat exchanger configured to receive and further cool the portion of the working fluid from the pump;
an isenthalpic valve configured to receive and expand the portion of the working fluid from the third ram-air heat exchanger;
an ambient air heat exchanger configured to receive the portion of the working fluid from the isenthalpic valve and cool the ambient air of an aircraft via the portion of the working fluid; and
a second compressor configured to receive and pressurize the portion of the working fluid from the ambient air heat,
wherein the ram-air heat exchanger is configured to receive the portion of the working fluid from the second compressor, and wherein the portion of the working fluid from the second compressor is mixed with the working fluid in the power cycle.

2. The system of claim 1, wherein the working fluid is supercritical carbon dioxide.

3. The system of claim 1, wherein the working fluid is a noble gas.

4. The system of claim 1 further comprising:
a generator coupled to the drive shaft via a second shaft, wherein the drive shaft and the second shaft drive the generator to produce electrical power.

5. The system of claim 1 further comprising:
a generator coupled to the turbine via the drive shaft, wherein the turbine and the drive shaft drive the generator to produce electrical power.

6. A system comprising:
a power cycle comprising:
a first compressor used to pressurize a working fluid within the power cycle;
a recuperative heat exchanger configured to receive the working fluid from the first compressor in a first pass and heats the first pass of the working fluid from the first compressor;
a waste-heat heat exchanger configured to receive the working fluid from the first pass of the recuperative heat exchanger and further heat the working fluid from the first pass of the recuperative heat exchanger;
a turbine comprising a drive shaft coupled to the first compressor, wherein the turbine is configured to receive the working fluid from the waste-heat heat exchanger, and wherein the working fluid from the waste-heat heat exchanger drives the turbine, the drive shaft, and the first compressor,
wherein the recuperative heat exchanger is configured to receive the working fluid from the turbine in a second pass and cool the second pass of the working fluid from the turbine; and
a first pass through at least one ram-air heat exchanger configured to receive the second pass of the working fluid from the recuperative heat exchanger and further cools the second pass of the working fluid from the recuperative heat exchanger,
wherein the first compressor is configured to receive the working fluid from the at least one ram-air heat exchanger and pressurize the working fluid from the at least one ram-air heat exchanger; and
a cooling cycle comprising:
a second pass through the at least one ram-air heat exchanger configured to receive a portion of the working fluid from the first compressor and cool the portion of the working fluid from the first compressor;
a pump configured to receive the portion of the working fluid from the second pass through the at least one ram-air heat exchanger and pressurize the portion of the working fluid from the second pass through the at least one ram-air heat exchanger;

a third pass through the at least one ram-air heat exchanger configured to receive the portion of the working fluid from the pump and to further cool the portion of the working fluid from the pump;

an isenthalpic valve configured to receive the portion of the working fluid from the third pass through the at least one ram-air heat exchanger and expand the portion of the working fluid from the third pass through the at least one ram-air heat exchanger;

an ambient air heat exchanger configured to receive the portion of the working fluid from the isenthalpic valve and cool an ambient air of an aircraft at altitude via the portion of the working fluid from the isenthalpic valve; and a second compressor configured to receive the portion of the working fluid from the ambient air heat exchanger and pressurize the portion of the working fluid from the ambient air heat exchanger, wherein the at least one ram-air heat exchanger is configured to receive the portion of the working fluid from the second compressor, and wherein the portion of the working fluid from the second compressor is mixed with the working fluid in the power cycle.

7. The system of claim 6, wherein the working fluid is supercritical carbon dioxide.

8. The system of claim 6, wherein the working fluid is a noble gas.

9. The system of claim 6 further comprising:
a generator coupled to the drive shaft via a second shaft, wherein the drive shaft and the second shaft drive the generator to produce electrical power.

10. The system of claim 6 further comprising:
a generator coupled to the turbine via the drive shaft, wherein the turbine and the drive shaft drive the generator to produce electrical power.

11. The system of claim 6, wherein the at least one ram-air heat exchanger further comprises:
a first ram-air heat exchanger, wherein the first ram-air heat exchanger comprises the first pass of the heat exchanger and the second pass of the heat exchanger; and
a second ram-air heat exchanger, wherein the second ram-air heat exchanger comprises the third pass of the heat exchanger.

12. The system of claim 6, wherein the at least one ram-air heat exchanger further comprises:
a first ram-air heat exchanger, wherein the first ram-air heat exchanger comprises the first pass of the heat exchanger; and
a second ram-air heat exchanger, wherein the second ram-air heat exchanger comprises the second pass of the heat exchanger and the third pass of the heat exchanger.

13. The system of claim 6, wherein the at least one ram-air heat exchanger further comprises:
a first ram-air heat exchanger, wherein the first ram-air heat exchanger comprises the first pass of the heat exchanger;
a second ram-air heat exchanger, wherein the second ram-air heat exchanger comprises the second pass of the heat exchanger; and
a third ram-air heat exchanger, wherein the third ram-air heat exchanger comprises the third pass of the heat exchanger.

14. A method comprising:
pressurizing a working fluid within a power cycle via a first compressor;
heating the working fluid via a first pass of a recuperative heat exchanger, wherein the first pass of the recuperative heat exchanger receives the working fluid from the first compressor;
heating the working fluid via a waste-heat heat exchanger, wherein the waste-heat heat exchanger receives the working fluid from the first pass of the recuperative heat exchanger;
driving a turbine, a drive shaft, and the first compressor, wherein the turbine receives the working fluid from the waste-heat heat exchanger, and wherein the turbine is coupled to the drive shaft and the first compressor;
cooling the working fluid from the turbine via a second pass of the recuperative heat exchanger;
cooling the working fluid from the second pass of the recuperative heat exchanger further via a ram-air heat exchanger;
pressurizing the working fluid from the ram-air heat exchanger via the first compressor;
capturing a portion of the working fluid from the first compressor to power a cooling cycle;
cooling the portion of the working fluid from the first compressor via a second ram-air heat exchanger;
pressurizing the portion of the working fluid from the second ram-air heat exchanger via a pump;
cooling the portion of the working fluid from the pump via a third ram-air heat exchanger;
expanding the portion of the working fluid from the third ram-air heat exchanger via an isenthalpic valve;
cooling ambient air via an ambient air heat exchanger using the portion of the working fluid from the isenthalpic valve;
pressurizing the portion of the working fluid from the ambient air heat exchanger via a second compressor; and
mixing the portion of the working fluid from the second compressor with the working fluid of the power cycle via the ram-air heat exchanger.

15. The method of claim 14 further comprising:
generating electrical energy via a generator coupled to the drive shaft via a second shaft.

16. The method of claim 14 further comprising:
generating electrical energy via a generator coupled to the turbine via the drive shaft.

17. The method of claim 14 further comprising:
cooling a cabin of an aircraft via the cooled ambient air.

18. The method of claim 14 further comprising:
cooling an electrical panel of an aircraft via the cooled ambient air.

19. The method of claim 14, wherein the working fluid is a supercritical carbon dioxide.

20. The method of claim 14, wherein the working fluid is a noble gas.

* * * * *